(12) United States Patent
Chuang et al.

(10) Patent No.: US 12,630,244 B2
(45) Date of Patent: May 19, 2026

(54) SEAT POST, BICYCLE AND TRAVEL SPACER INSTALLING METHOD

(71) Applicant: GIANT MANUFACTURING CO., LTD., Taichung City (TW)

(72) Inventors: Cheng Ru Chuang, Taichung City (TW); Tsung Mu Tsai, Taichung City (TW)

(73) Assignee: GIANT MANUFACTURING CO., LTD., Taichung City (TW)

( * ) Notice: Subject to any disclaimer, the term of this patent is extended or adjusted under 35 U.S.C. 154(b) by 278 days.

(21) Appl. No.: 18/653,932

(22) Filed: May 2, 2024

(65) Prior Publication Data

US 2024/0367740 A1      Nov. 7, 2024

Related U.S. Application Data

(60) Provisional application No. 63/499,981, filed on May 4, 2023.

(51) Int. Cl.
| | |
|---|---|
| B62J 1/08 | (2006.01) |
| B62J 1/28 | (2006.01) |
| B62J 45/00 | (2020.01) |

(52) U.S. Cl.
CPC ............ B62J 1/08 (2013.01); B62J 2001/085 (2013.01)

(58) Field of Classification Search
CPC ........... B62J 1/08; B62J 2001/085; B62J 1/06
See application file for complete search history.

(56) References Cited

U.S. PATENT DOCUMENTS

| | | | | |
|---|---|---|---|---|
| 10,246,155 | B2 * | 4/2019 | McAndrews | .......... B62K 19/36 |
| 10,689,049 | B2 * | 6/2020 | Chiesa | .................... B62K 19/36 |
| 11,548,580 | B2 * | 1/2023 | Sakagawa | ................... B62J 1/08 |
| 11,649,002 | B2 * | 5/2023 | Shipman | .................... B62J 1/08 |
| | | | | 297/215.13 |
| 11,679,830 | B2 * | 6/2023 | Tso | ............................ B62J 1/08 |
| | | | | 297/195.1 |
| 11,780,521 | B2 * | 10/2023 | Dubois | ...................... B62J 1/08 |
| | | | | 297/195.1 |

(Continued)

FOREIGN PATENT DOCUMENTS

| | | |
|---|---|---|
| TW | M576558 U | 4/2019 |
| TW | 201943591 A | 11/2019 |

(Continued)

*Primary Examiner* — Shin H Kim
(74) *Attorney, Agent, or Firm* — CKC & Partners Co., LLC

(57)      ABSTRACT

A seat post has an axis direction and includes a lower tube, a gas cylinder, an upper tube, a first stop element, a travel spacer and a second stop element. The lower tube includes a lower tube inner surface, an accommodating space and an opening. The lower tube inner surface forms the accommodating space and includes a lower overlap area. The upper tube includes an upper tube outer surface, which includes an upper overlap area. The upper tube is movably sleeved on an outside of the gas cylinder along the axis direction and disposed on an inside of the lower overlap area. The travel spacer is disposed between the upper overlap area and the lower overlap area. The first stop element, the travel spacer and the second stop element are arranged in sequence along an elongation direction from the accommodating space to the opening.

15 Claims, 14 Drawing Sheets

100

100

(56)         References Cited

U.S. PATENT DOCUMENTS

| | | | |
|---|---|---|---|
| 11,780,522 B2 * | 10/2023 | Tso | B62J 11/19 |
| | | | 297/215.13 |
| 12,151,758 B2 * | 11/2024 | Shirai | F16H 53/00 |
| 2011/0204201 A1 * | 8/2011 | Kodama | B62J 1/08 |
| | | | 248/404 |
| 2018/0273123 A1 * | 9/2018 | Eberlberger | F16H 25/2015 |
| 2019/0367114 A1 * | 12/2019 | Winefordner | B62J 1/08 |
| 2020/0277020 A1 | 9/2020 | Tang | |
| 2021/0094642 A1 | 4/2021 | Dubois et al. | |
| 2022/0041236 A1 | 2/2022 | Lin | |
| 2022/0041237 A1 * | 2/2022 | Tso | B62K 19/36 |
| 2022/0055704 A1 | 2/2022 | Lin | |
| 2022/0126939 A1 * | 4/2022 | Tso | B62J 1/08 |
| 2024/0101207 A1 * | 3/2024 | Shirai | H02K 7/116 |
| 2025/0100638 A1 * | 3/2025 | Shipman | B62J 45/00 |
| 2025/0100639 A1 * | 3/2025 | Shipman | B62J 1/08 |
| 2025/0100640 A1 * | 3/2025 | Shipman | B62K 19/36 |
| 2025/0162673 A1 * | 5/2025 | Schlanger | B62J 1/10 |
| 2025/0171096 A1 * | 5/2025 | Feng | B62J 1/02 |
| 2025/0187687 A1 * | 6/2025 | Dunlap | B62J 1/08 |

FOREIGN PATENT DOCUMENTS

| | | | |
|---|---|---|---|
| TW | 202015959 A | 5/2020 | |
| TW | I751864 B | 1/2022 | |

* cited by examiner

100 x1

130

160

150

110

111

112

150

159

200

118

110

111

250

130  131

130

260

244

240

120

300

301

302

400

410 tearing travel spacer apart to be shortened to required length 420 loosening sealing assembly between upper tube and lower tube 430 exposing annular gap between upper tube and lower tube 440 sleeving travel spacer on upper tube outer surface 450 moving travel spacer into annular gap 460 positioning sealing assembly to seal annular gap

SEAT POST, BICYCLE AND TRAVEL SPACER INSTALLING METHOD

RELATED APPLICATIONS

This application claims priority to U.S. Provisional Application Ser. No. 63/499,981, filed May 4, 2023, which is herein incorporated by reference.

BACKGROUND

Technical Field

The present disclosure relates to a seat post, a bicycle and a travel spacer installing method. More particularly, the present disclosure relates to a seat post, a bicycle and a travel spacer installing method for adjusting the maximum length of the seat post.

Description of Related Art

With the increasing popularity of health and sports activities, bicycle users have increasingly higher requirements for riding comfort and fitness efficiency. Bicycle users often adjust the structural dimensions of their bicycles, such as the seat post length, according to their body shapes and habits before or during riding, in order to achieve riding comfort and safety. However, under different usage scenarios, the required travel range of the bicycle seat post will also be different. For example, the adjustable travel range required for riding downhill is different from those required for riding on flat ground. If the same adjustable seat post can be given multiple travel ranges, it is beneficial to reduce the burden on consumers to purchase multiple adjustable seat posts.

Given the above, regarding the structural design of the conventional bicycle, there is indeed an improvement need and motivation to simultaneously reduce the design difficulty and the complexity of the size adjustment.

SUMMARY

According to one aspect of the present disclosure, a seat post has an axis direction and includes a lower tube, a gas cylinder, an upper tube, a first stop element, a travel spacer and a second stop element. The lower tube includes a lower tube inner surface, an accommodating space and an opening. The lower tube inner surface forms the accommodating space and includes a lower overlap area. The gas cylinder is fixedly disposed in the accommodating space. The upper tube includes an upper tube outer surface, which includes an upper overlap area. The upper tube is movably sleeved on an outside of the gas cylinder along the axis direction and disposed on an inside of the lower overlap area, so that the upper tube is able to extend from the opening. The upper overlap area and the lower overlap area are correspondingly disposed, and ranges of the upper overlap area and the lower overlap area are changeable along with a movement of the upper tube. The first stop element is disposed between the upper overlap area and the lower overlap area. The travel spacer is in an annular shape. The second stop element is sleeved on an outside of the upper tube. The travel spacer is disposed between the upper overlap area and the lower overlap area. The first stop element, the travel spacer and the second stop element are arranged in sequence along an elongation direction from the accommodating space to the opening.

According to another aspect of the present disclosure, a bicycle includes the seat post of the aforementioned aspect and a seat cushion, which is connected to the seat post.

According to further another aspect of the present disclosure, a travel spacer installing method for installing a travel spacer of a seat post of a bicycle includes: loosening a sealing assembly between an upper tube and a lower tube of the seat post; exposing an annular gap between the upper tube and the lower tube; sleeving the travel spacer in an annular shape on an upper tube outer surface of the upper tube; moving the travel spacer into the annular gap; and positioning the sealing assembly to seal the annular gap.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1A:
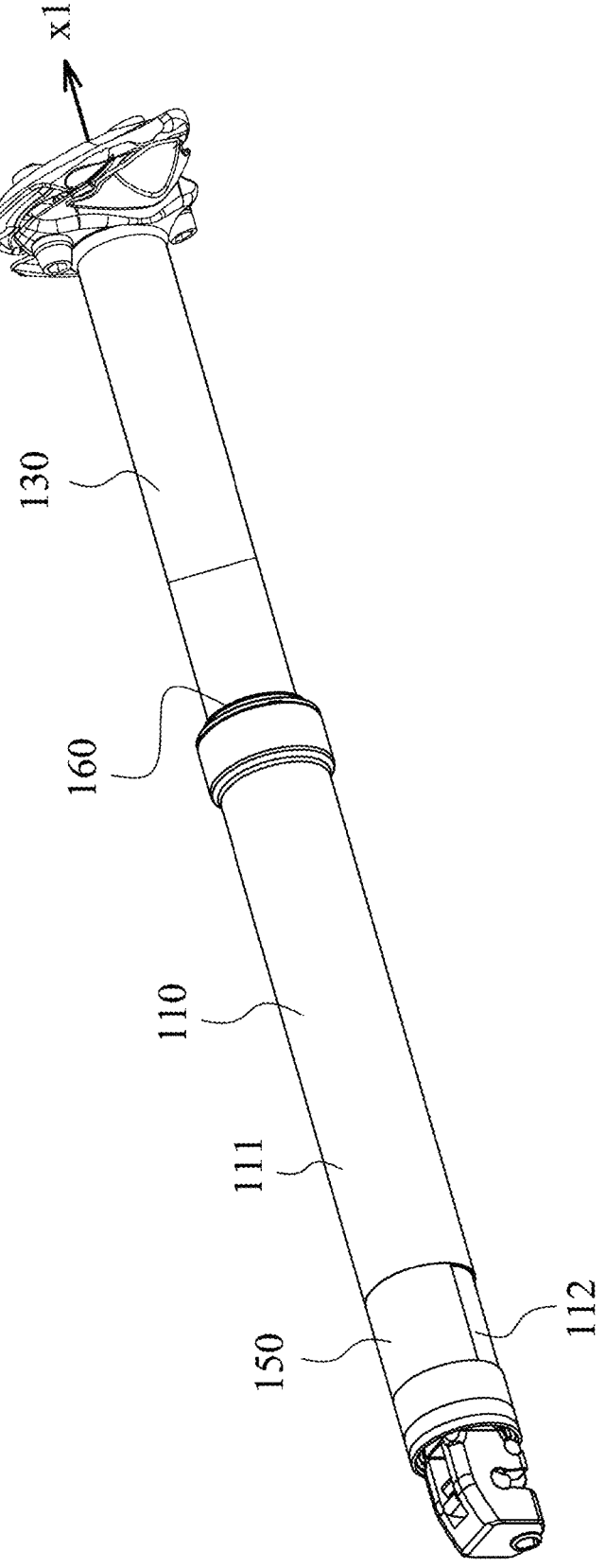
FIG. 1A is a three-dimensional view of a seat post in a storage state according to the first embodiment of the present disclosure.

Embodiments of the present disclosure will be described below with reference to the drawings. For the sake of clarity, many practical details will be explained together in the following statements. However, it should be understood that these practical details should not be used to limit the present disclosure. That is, these practical details are not necessary in embodiments of the present disclosure. In addition, for the sake of simplifying the drawings, some commonly used structures and components are shown in the drawings in a simple schematic manner; and repeated components may be represented by the same numbers.

In addition, the terms first, second, etc. are used herein to describe various elements or components, these elements or components should not be limited by these terms. Consequently, a first element or component discussed below could be termed a second element or component. Moreover, the combination of components in the present disclosure is not a combination that is generally known, conventional or customary in this field. The components themselves being or being not common knowledge cannot be used to determine whether the combination relationship can be easily completed by a person skilled in the technical field.

Figure 1B:
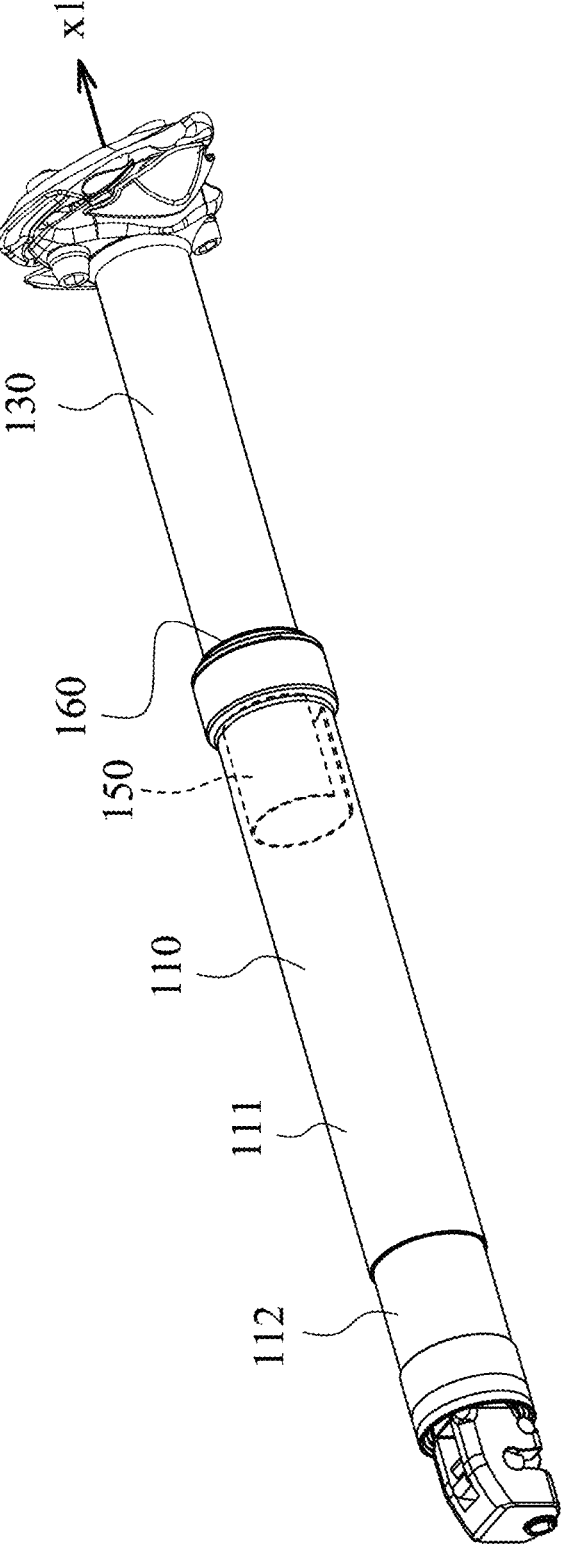
FIG. 1B is a three-dimensional view of the seat post in an operating state of the first embodiment.
Figure 1C:
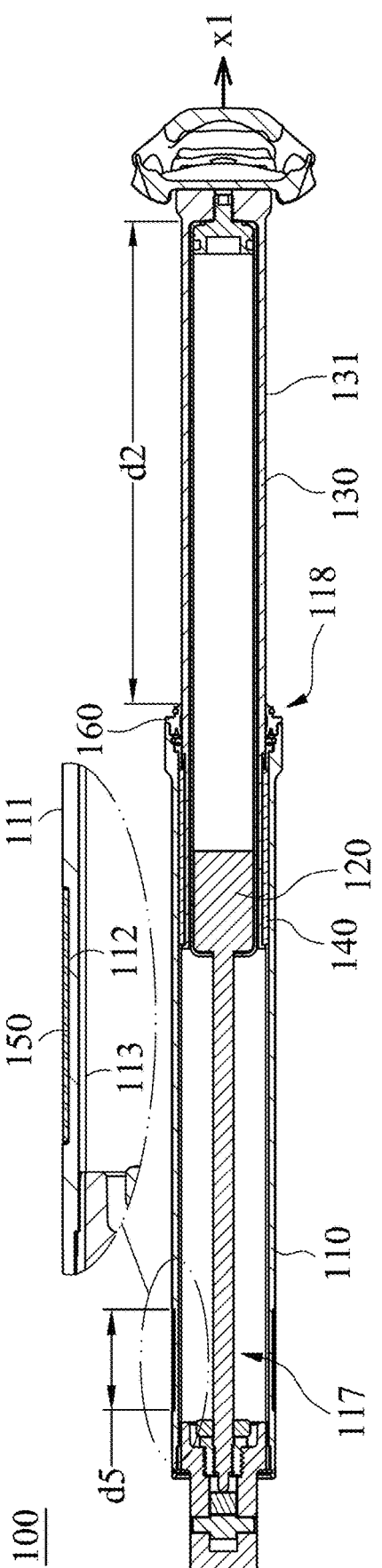
FIG. 1C is a cross-sectional view of the seat post in FIG. 1A.
Figure 1D:
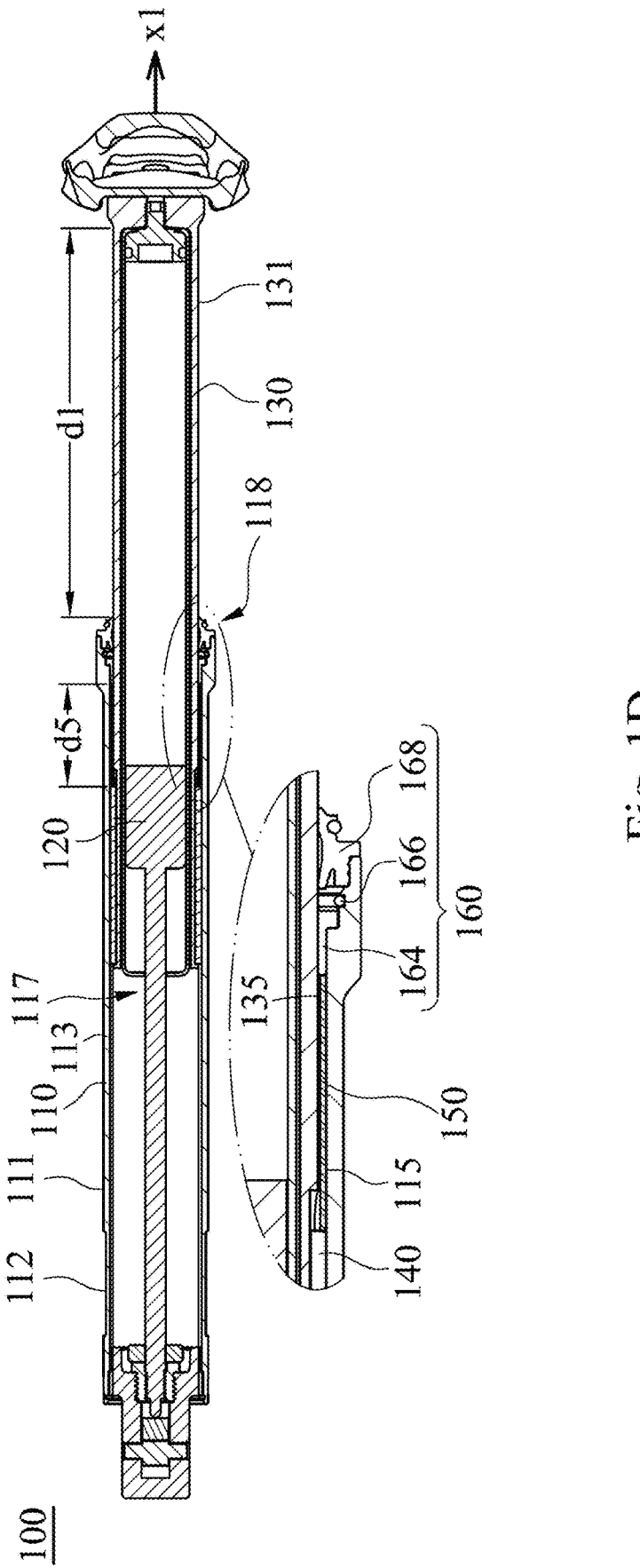
FIG. 1D is a cross-sectional view of the seat post in FIG. 1B.
Figure 1E:
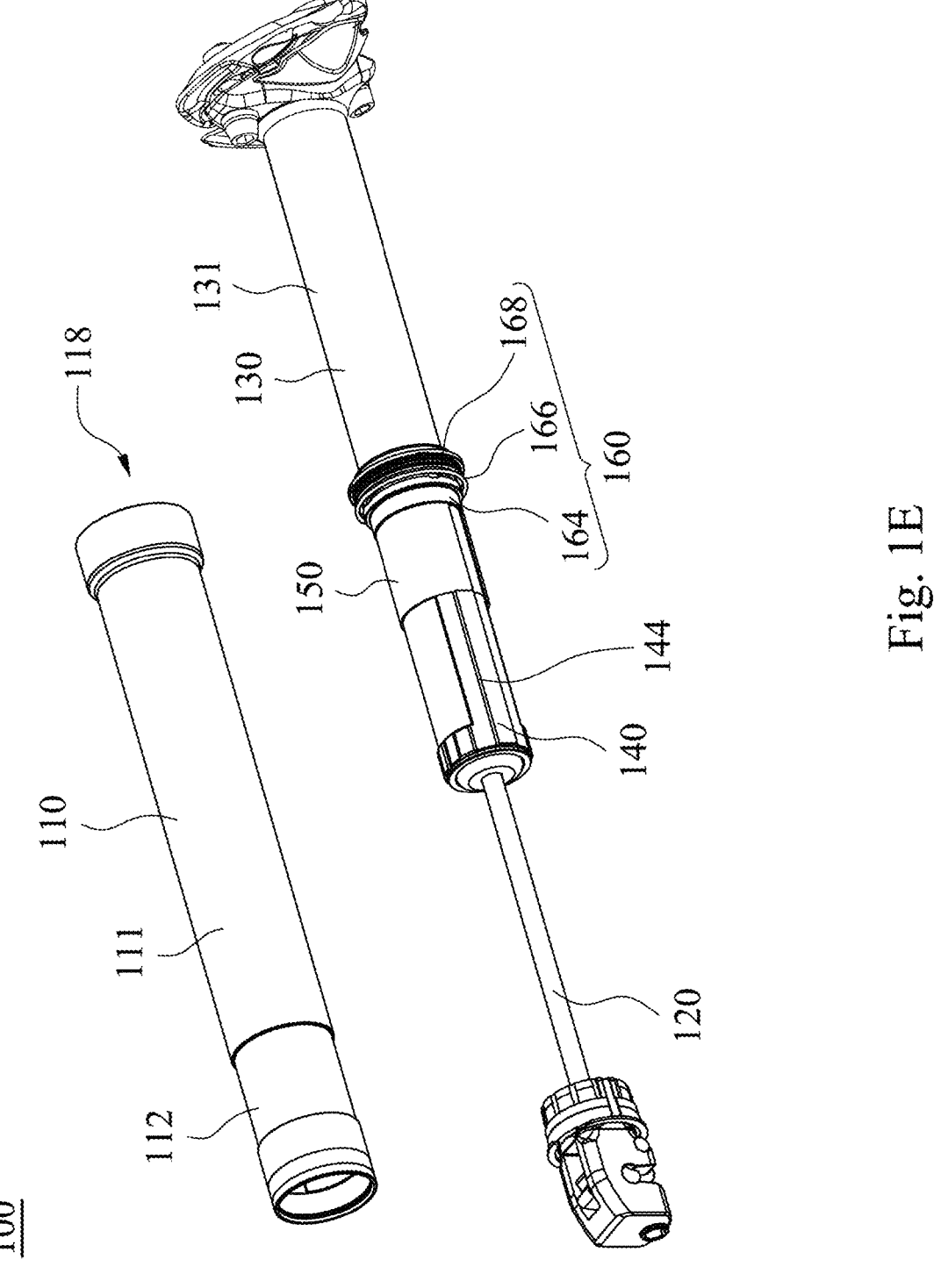
FIG. 1E is an exploded view of the seat post in FIG. 1B.
Figure 1F:
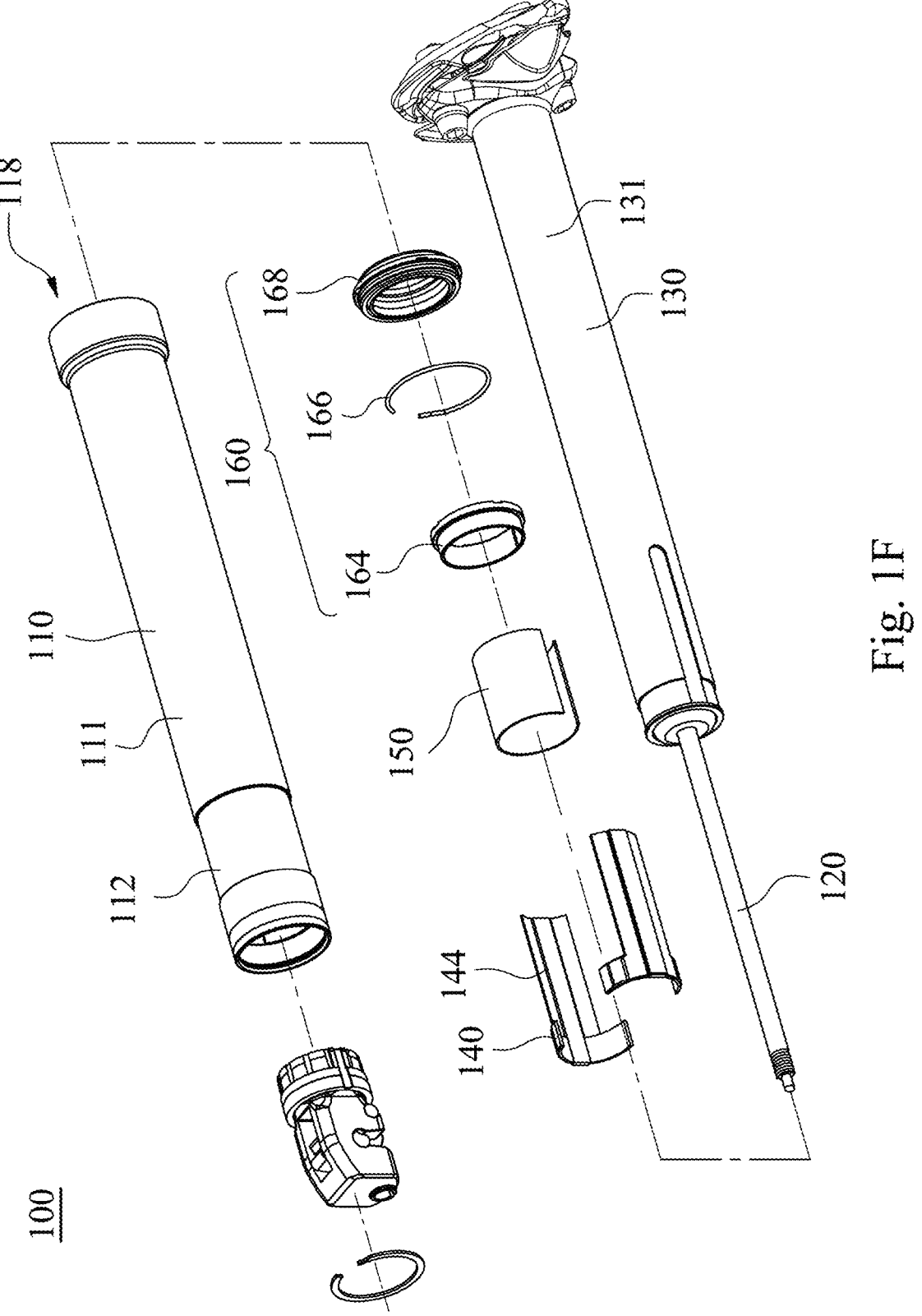
FIG. 1F is another exploded view of the seat post in FIG. 1B.

FIG. 1A is a three-dimensional view of a seat post 100 in a storage state according to the first embodiment of the present disclosure, FIG. 1B is a three-dimensional view of the seat post 100 in an operating state of the first embodiment, FIG. 1C is a cross-sectional view of the seat post 100 in FIG. 1A, FIG. 1D is a cross-sectional view of the seat post 100 in FIG. 1B, FIG. 1E is an exploded view of the seat post 100 in FIG. 1B, and FIG. 1F is another exploded view of the seat post 100 in FIG. 1B. With reference to FIG. 1A to FIG. 1F, the seat post 100 has an axis direction x1 and includes a lower tube 110, a gas cylinder 120, an upper tube 130, a first stop element 140, a travel spacer 150 and a second stop element 164. In the first embodiment, the seat post 100 may be a seat post of a bicycle or an indoor exercise bike, and the present disclosure is not limited thereto.

With reference to FIG. 1D to FIG. 1F, the lower tube 110 includes a lower tube inner surface 113, an accommodating space 117 and an opening 118. The lower tube inner surface 113 forms the accommodating space 117 and includes a lower overlap area 115. The gas cylinder 120 is fixedly disposed in the accommodating space 117, and two ends of the gas cylinder 120 are specifically fixed on the lower tube 110 and the upper tube 130, respectively. The upper tube 130 includes an upper tube outer surface 131, which includes an upper overlap area 135. The upper tube 130 is movably sleeved on an outside of the gas cylinder 120 along the axis direction x1 and disposed on an inside of the lower overlap area 115, so that the upper tube 130 is able to extend from the opening 118, that is, the upper tube 130 is able to stretch out from and draw back into the opening 118, and lengthen and shorten from the opening 118. The upper overlap area 135 and the lower overlap area 115 are correspondingly disposed, ranges of the upper overlap area 135 and the lower overlap area 115 are changeable along with a movement of the upper tube 130, and an annular gap (not labeled) is formed between the upper overlap area 135 and the lower overlap area 115, as shown in FIG. 1D. The first stop element 140 is disposed between the upper overlap area 135 and the lower overlap area 115, that is, disposed in the annular gap. The travel spacer 150 is in an annular shape. The second stop element 164 is sleeved on an outside of the upper tube 130. The travel spacer 150 is disposed between the upper overlap area 135 and the lower overlap area 115, that is, disposed in the annular gap. The first stop element 140, the travel spacer 150 and the second stop element 164 are disposed in the annular gap and coaxially arranged in sequence along an elongation direction from the accommodating space 117 to the opening 118, and the elongation direction is the direction from left to right shown in FIG. 1D. Therefore, the maximum exposed length of the upper tube 130 can be reduced via the arrangement of the travel spacer 150, that is, the maximum length of the seat post 100 can be reduced.

In detail, when two ends of the travel spacer 150 along the axis direction x1 contact the first stop element 140 and the second stop element 164, respectively, the upper tube 130 may have a first maximum exposed length d1, as shown in FIG. 1D. Therefore, in the axis direction x1, by disposing the travel spacer 150 between the first stop element 140 and the second stop element 164, the maximum exposed length of the upper tube 130 can be reduced to the first maximum exposed length d1, that is, the maximum length of the seat post 100 can be reduced. It is beneficial to select an appropriate maximum exposed length of the upper tube 130 according to usage requirements, that is, select an appropriate maximum length of the seat post 100.

With reference to FIG. 1B and FIG. 1D, when the travel spacer 150 is in the operating state, the travel spacer 150 is disposed between the upper overlap area 135 and the lower overlap area 115. Furthermore, the seat post 100 in the first embodiment can be in the operating state or the storage state, and another embodiment of the seat post in accordance with the present disclosure may be only in an operating state.

With reference to FIG. 1A, FIG. 1C and FIG. 1D, when the travel spacer 150 is in the storage state, the travel spacer 150 is not disposed between the upper overlap area 135 and the lower overlap area 115. When the travel spacer 150 is in the storage state and the first stop element 140 and the second stop element 164 are in contact, the upper tube 130 may have a second maximum exposed length d2, and the first maximum exposed length d1 is smaller than the second maximum exposed length d2, as shown in FIG. 1C and FIG. 1D. Therefore, by changing between the operating state and the storage state of the travel spacer 150, the maximum exposed length of the upper tube 130 can be selected between the first maximum exposed length d1 and the second maximum exposed length d2, that is, one of the two maximum lengths of the seat post 100 can be chosen to more meet the usage needs.

The lower tube 110 further includes a lower tube outer surface 111, which may include an annular groove area 112. When the travel spacer 150 is in the storage state, the travel spacer 150 is sleeved on the annular groove area 112. Therefore, it is advantageous in increasing the convenience of switching between the storage state and the operating state of the travel spacer 150, and the travel spacer 150 in the storage state does not affect riding. In other embodiment according to the present disclosure, a lower tube outer surface may not include an annular groove area, and a travel spacer may be sleeved on the lower tube outer surface or any suitable position on the bicycle.

With reference to FIG. 1C and FIG. 1D, a sum of a spacer length d5 of the travel spacer 150 along the axis direction x1 and the first maximum exposed length d1 may be equal to the second maximum exposed length d2. Therefore, it is advantageous for the user to estimate the effects of the storage state and the operating state switched to each other of the travel spacer 150. In the first embodiment, the spacer length d5 is 30 mm, the second maximum exposed length d2 of the travel spacer 150 in the storage state is X mm, and thereby the first maximum exposed length d1 of the travel spacer 150 in the operating state is (X-30) mm. The first maximum exposed length d1 is smaller than the second maximum exposed length d2 by 30 mm, that is, the maximum length of the seat post 100 is decreased by 30 mm.

With reference to FIG. 1D, when the travel spacer 150 is in the operating state, the travel spacer 150 may be movably disposed between the upper overlap area 135 and the lower overlap area 115 along the axis direction x1, that is, movably disposed in the annular gap. Therefore, when the two ends of the travel spacer 150 along the axis direction x1 are stopped and contacted by the first stop element 140 and the second stop element 164, respectively, the upper tube 130 can be stably stayed with the first maximum exposed length d1.

With reference to FIG. 1E, the first stop element 140 may be fixedly sleeved on the upper overlap area 135. Therefore, the upper tube 130 is beneficial to be stably stayed with the first maximum exposed length d1.

With reference to FIG. 1F, the first stop element 140 may be an anti-rotation element and disposed along a circumferential direction of the axis direction x1. Specifically, a number of the first stop element 140 is two. The two first stop elements 140 have the same structures, and each of the first stop elements 140 is in an arc-shaped T shape or a curved T shape. Each of the first stop elements 140 has a discontinuous outer surface 144 along the circumferential direction (e.g., a stepped shape on the outer surface). Therefore, the upper tube 130 is advantageous in not rotating during lengthening and shortening with the aid of the first stop element 140, thereby improving the stability of the lengthening and shortening process and the stopped state.

With reference to FIG. 1D to FIG. 1F, the seat post 100 may further include a sealing assembly 160, which is in an annular shape and sleeved on the outside of the upper tube 130. The sealing assembly 160 is connected to the lower tube 110 and disposed adjacent to the opening 118, so that the sealing assembly 160 seals the accommodating space 117 and the annular gap therein. At least part of the sealing assembly 160 is the second stop element 164. Therefore, it is beneficial to reduce the structural complexity.

The sealing assembly 160 may include a bushing and a clamp ring 166, and an elasticity of the bushing is greater than an elasticity of the clamp ring 166. The bushing is the second stop element 164 and disposed between the upper overlap area 135 and the lower overlap area 115. The sealing assembly 160 may further include a sealing element 168, and an elasticity of the sealing element 168 is greater than the elasticity of the clamp ring 166. The bushing (i.e., the second stop element 164), the clamp ring 166 and the sealing element 168 are coaxially arranged in sequence along the elongation direction. Therefore, it is beneficial to simplify the structure and maintain stability.

Figure 1G:
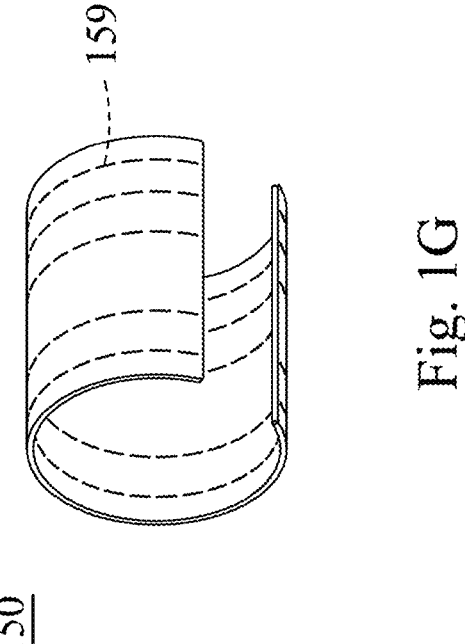
FIG. 1G is a three-dimensional view of the travel spacer in FIG. 1F.
Figure 1I:
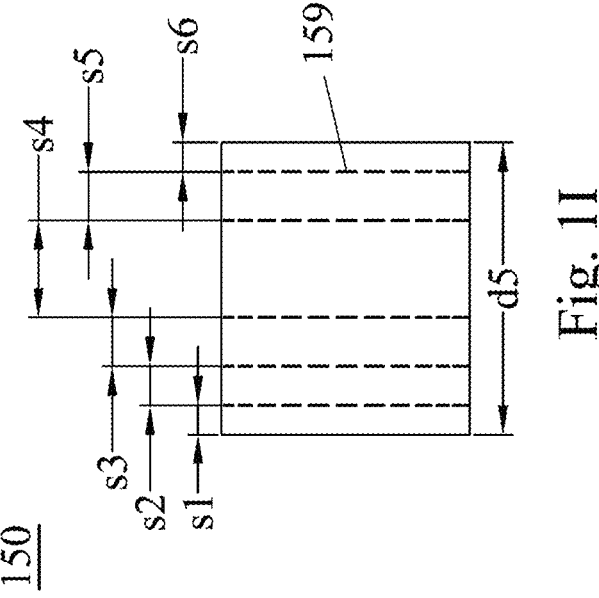
FIG. 1I is a front view of the travel spacer in FIG. 1F.
Figure 1H:
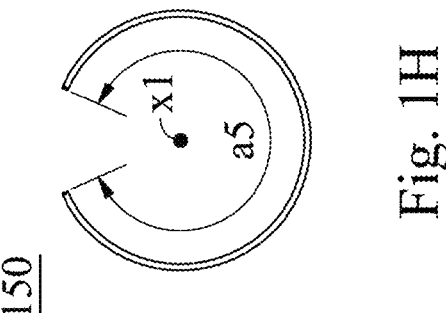
FIG. 1H is a side view of the travel spacer in FIG. 1F.

FIG. 1G is a three-dimensional view of the travel spacer 150 in FIG. 1F, FIG. 1H is a side view of the travel spacer 150 in FIG. 1F, and FIG. 1I is a front view of the travel spacer 150 in FIG. 1F. With reference to FIG. 1F to FIG. 1I, the travel spacer 150 may be in a non-closed annular shape, a C shape or an arc shape, so as to improve the elasticity in the circumferential direction along the axis direction x1. The arc shape of the travel spacer 150 along the circumferential direction of the axis direction x1 may be between 210 degrees and 350 degrees, i.e., the angle a5 shown in FIG. 1H. The spacer length d5 of the travel spacer 150 along the axis direction x1 may be between 10 mm and 60 mm. Therefore, it is beneficial to disassemble and assemble the travel spacer 150 on needs of the user and improve the stability of the travel spacer 150 in the operating state. Furthermore, in other embodiment according to the present disclosure, a travel spacer of a seat post may be in a closed annular shape.

The travel spacer 150 may include one or a plurality of cutting lines 159, and each of the cutting lines 159 is extended along the circumferential direction of the axis direction x1. The travel spacer 150 may be made of plastic material. Each of the cutting lines 159 may be a concave line, that is, the thickness of each of cutting lines 159 is smaller than the thickness of the travel spacer 150 other than the cutting lines 159. It is beneficial to facilitate the user to bend along any of the cutting lines 159 and tear the travel spacer 150 apart with bare hands to adjust the maximum length of the seat post 100, and maintain the structural strength of the travel spacer 150 with the cutting lines 159 thereon.

With reference to FIG. 1I, when the travel spacer 150 includes the plurality of cutting lines 159, at least two of spacings s1, s2, s3, s4, s5, s6 formed by the cutting lines 159 may be different. Therefore, by tearing off the travel spacer 150, different spacer lengths of the travel spacer 150 can be selected. In the first embodiment, the spacings s1, s2, s3, s4, s5, s6 are 3 mm, 4 mm, 5 mm, 10 mm, 5 mm, and 3 mm, respectively, so a variety of spacer lengths of the travel spacer 150 after being torn is between 3 mm and 27 mm, or the original spacer length d5 of 30 mm can be used without tearing the travel spacer 150. It is noted that the spacings formed by the cutting lines of the travel spacer of the seat post according to the present disclosure are not limited thereto.

Figure 2A:
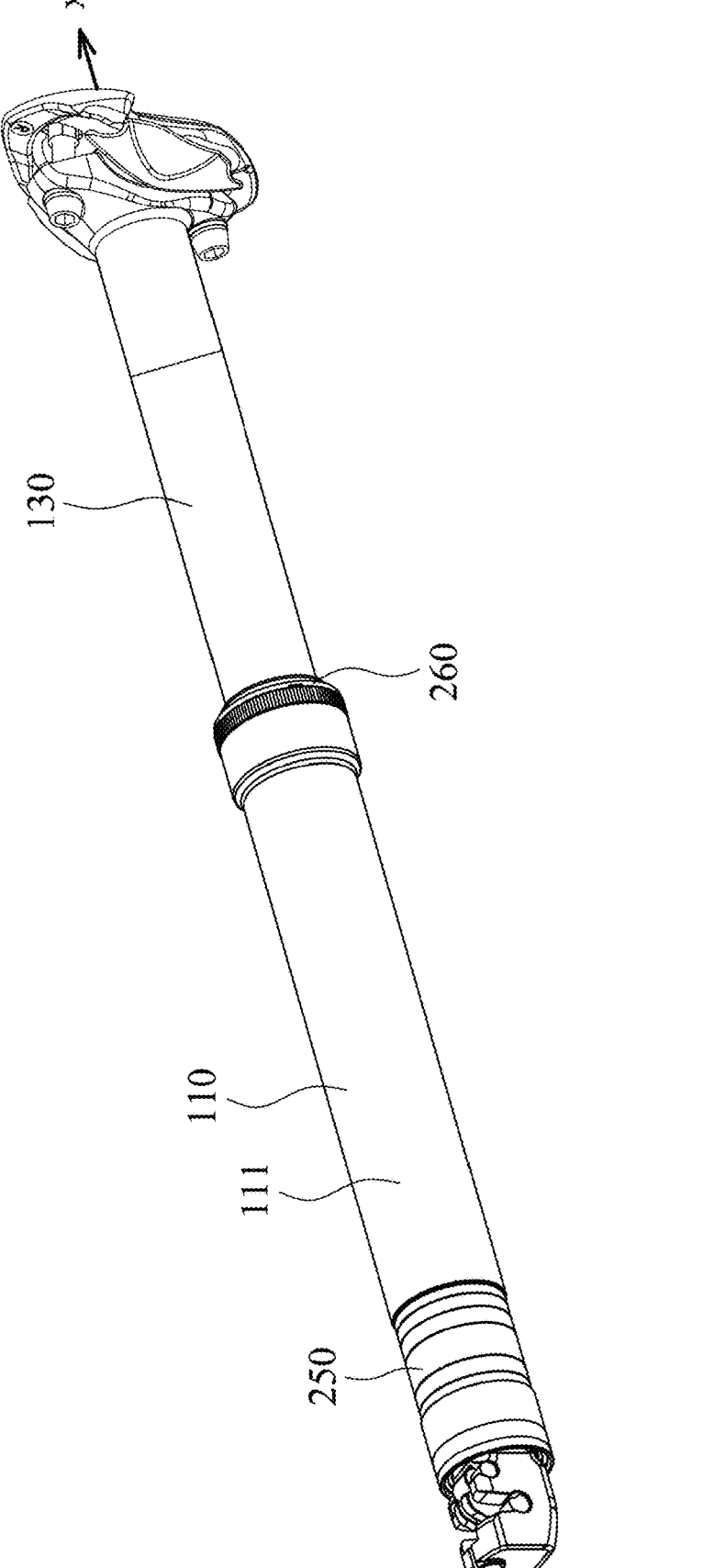
FIG. 2A is a three-dimensional view of a seat post in a storage state according to the second embodiment of the present disclosure.
Figure 2B:
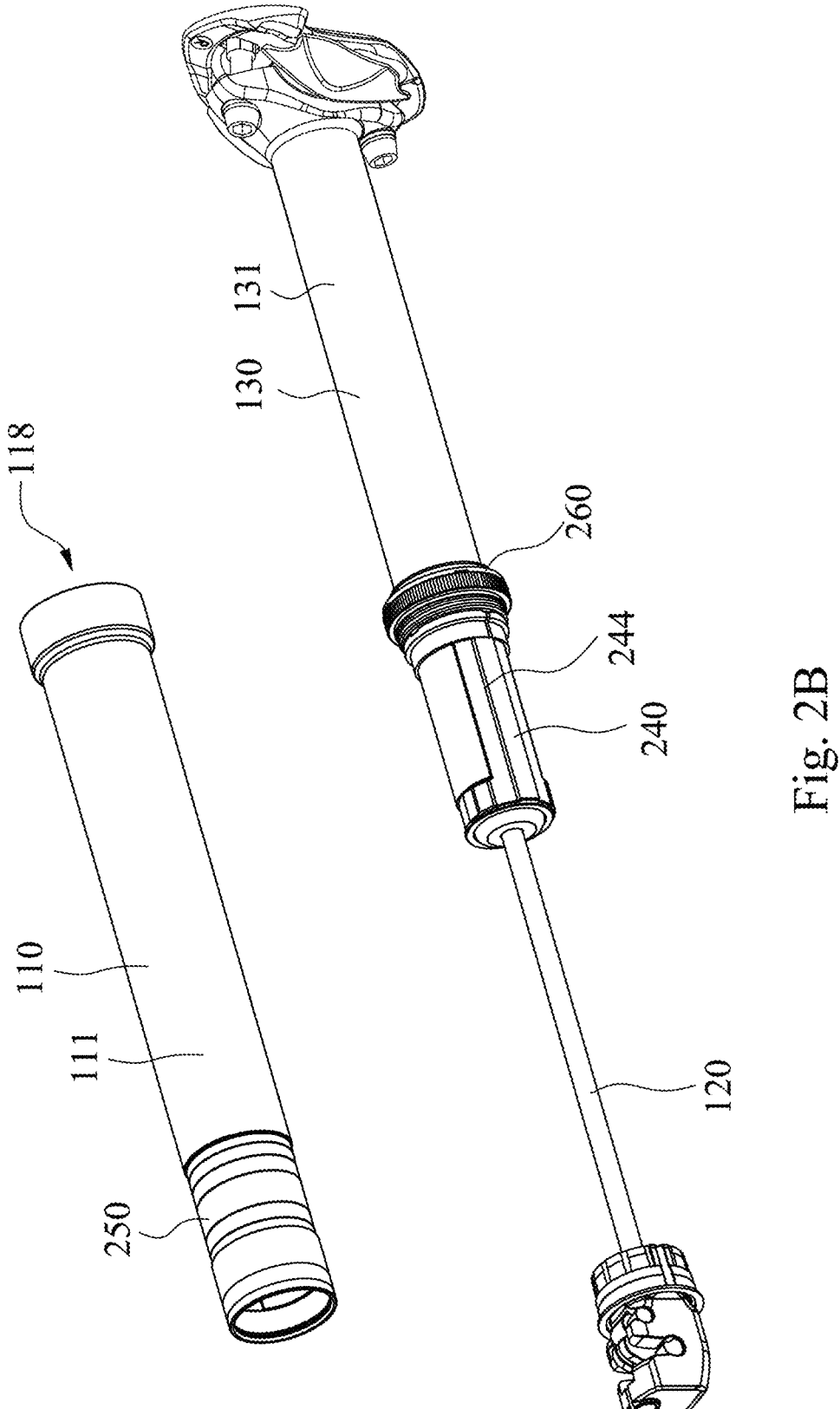
FIG. 2B is an exploded view of the seat post in FIG. 2A.
Figure 2C:
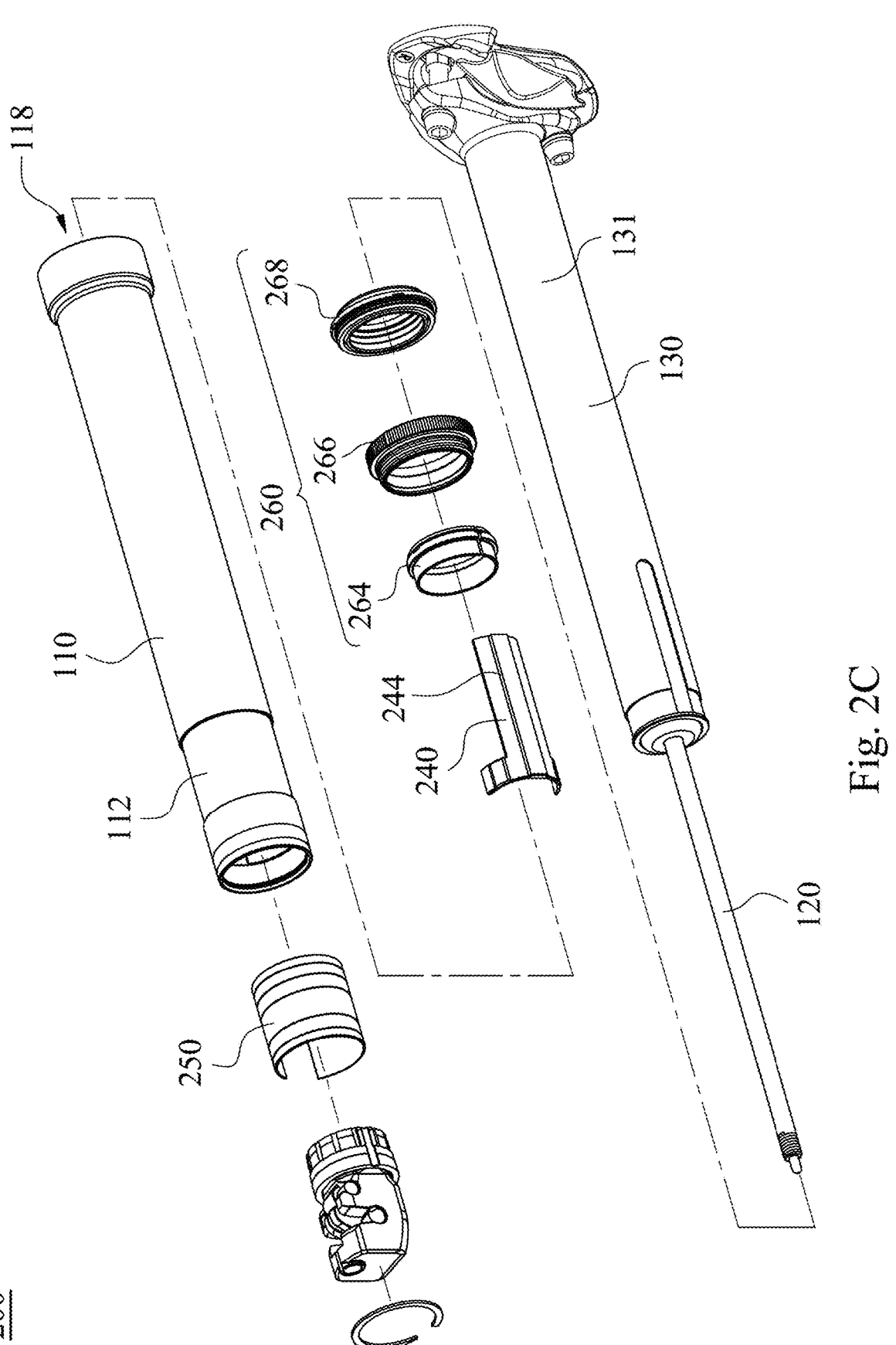
FIG. 2C is another exploded view of the seat post in FIG. 2A.

FIG. 2A is a three-dimensional view of a seat post 200 in a storage state according to the second embodiment of the present disclosure, FIG. 2B is an exploded view of the seat post 200 in FIG. 2A, and FIG. 2C is another exploded view of the seat post 200 in FIG. 2A. With reference to FIG. 2A to FIG. 2C, the seat post 200 has an axis direction x1 and includes a lower tube 110, a gas cylinder 120, an upper tube 130, a first stop element 240, a travel spacer 250 and a sealing assembly 260, and a bushing of the sealing assembly 260 is a second stop element 264.

The seat post 200 of the second embodiment can be in an operating state or a storage state. The main differences between the seat post 200 of the second embodiment and the aforementioned seat post 100 of the first embodiment are the first stop element 240 and sealing assembly 260 of the seat post 200 being different from the first stop element 140 and sealing assembly 160 of the seat post 100. The seat post 200 of the second embodiment can be known with reference to the seat post 100 of the first embodiment. The lower tube 110 of the seat post 200 includes a lower tube inner surface, an accommodating space and an opening 118. The lower tube inner surface forms the accommodating space and includes a lower overlap area. The gas cylinder 120 is fixedly disposed in the accommodating space. The upper tube 130 includes an upper tube outer surface 131, which includes an upper overlap area. The upper tube 130 is movably sleeved on an outside of the gas cylinder 120 along the axis direction x1 and disposed on an inside of the lower overlap area, so that the upper tube 130 is able to extend from the opening 118. The upper overlap area and the lower overlap area are correspondingly disposed, ranges of the upper overlap area and the lower overlap area are changeable along with a movement of the upper tube 130, and an annular gap is formed between the upper overlap area and the lower overlap area. The first stop element 240 is disposed between the upper overlap area and the lower overlap area. The travel spacer 250 is in an annular shape. The second stop element 264 is sleeved on an outside of the upper tube 130.

When the travel spacer 250 is in the operating state, the travel spacer 250 is disposed between the upper overlap area and the lower overlap area, and the first stop element 240, the travel spacer 250 and the second stop element 264 are coaxially arranged in sequence along an elongation direction from the accommodating space to the opening 118. When the travel spacer 250 is in the operating state and two ends of the travel spacer 250 along the axis direction x1 contact the first stop element 240 and the second stop element 264, respectively, the upper tube 130 has a first maximum exposed length.

When the travel spacer 250 is in the storage state, the travel spacer 250 is sleeved on an annular groove area 112 of a lower tube outer surface. When the travel spacer 250 is in the storage state and the first stop element 240 and the second stop element 264 are in contact, the upper tube 130 has a second maximum exposed length, and the first maximum exposed length is smaller than the second maximum exposed length.

In the 2nd embodiment, the first stop element 240 is an anti-rotation element and disposed along a circumferential direction of the axis direction x1. Specifically, a number of the first stop element 240 is one. The first stop element 240 is in an arc-shaped T shape or a curved T shape and has a discontinuous outer surface 244 along the circumferential direction.

Figure 2D:
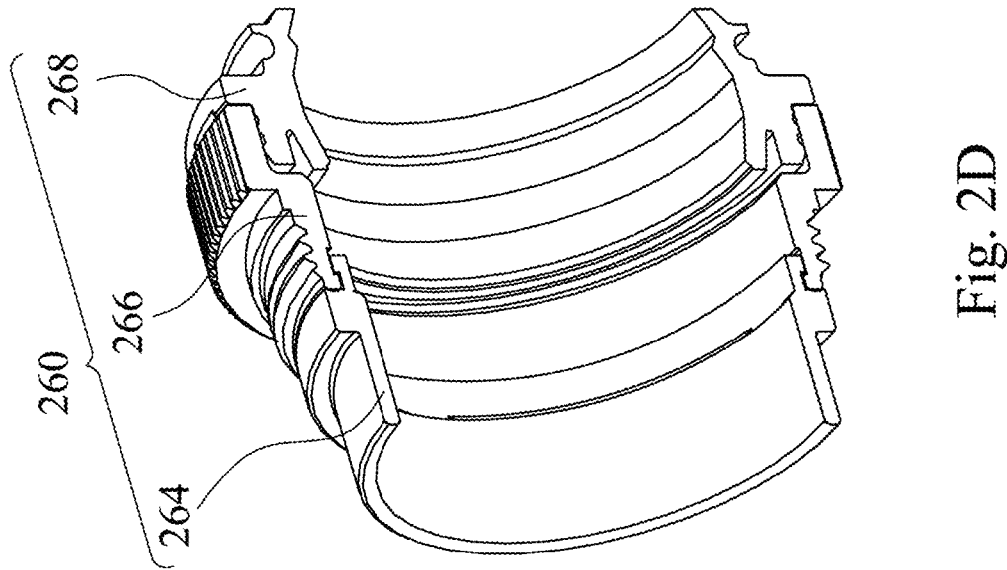
FIG. 2D is a cross-sectional view of the sealing assembly in FIG. 2C.

FIG. 2D is a cross-sectional view of the sealing assembly 260 in FIG. 2C. With reference to FIG. 2C and FIG. 2D, the sealing assembly 260 is in an annular shape and sleeved on the outside of the upper tube 130. The sealing assembly 260 is connected to the lower tube 110 and disposed adjacent to the opening 118, so that the sealing assembly 260 seals the accommodating space. The sealing assembly 260 includes the bushing (i.e., the second stop element 264), a clamp ring 266 and a sealing element 268, and elasticities of the bushing and sealing element 268 are greater than an elasticity of the clamp ring 266. The bushing, the clamp ring 266 and the sealing element 268 are coaxially arranged in sequence along the elongation direction.

Figure 3:
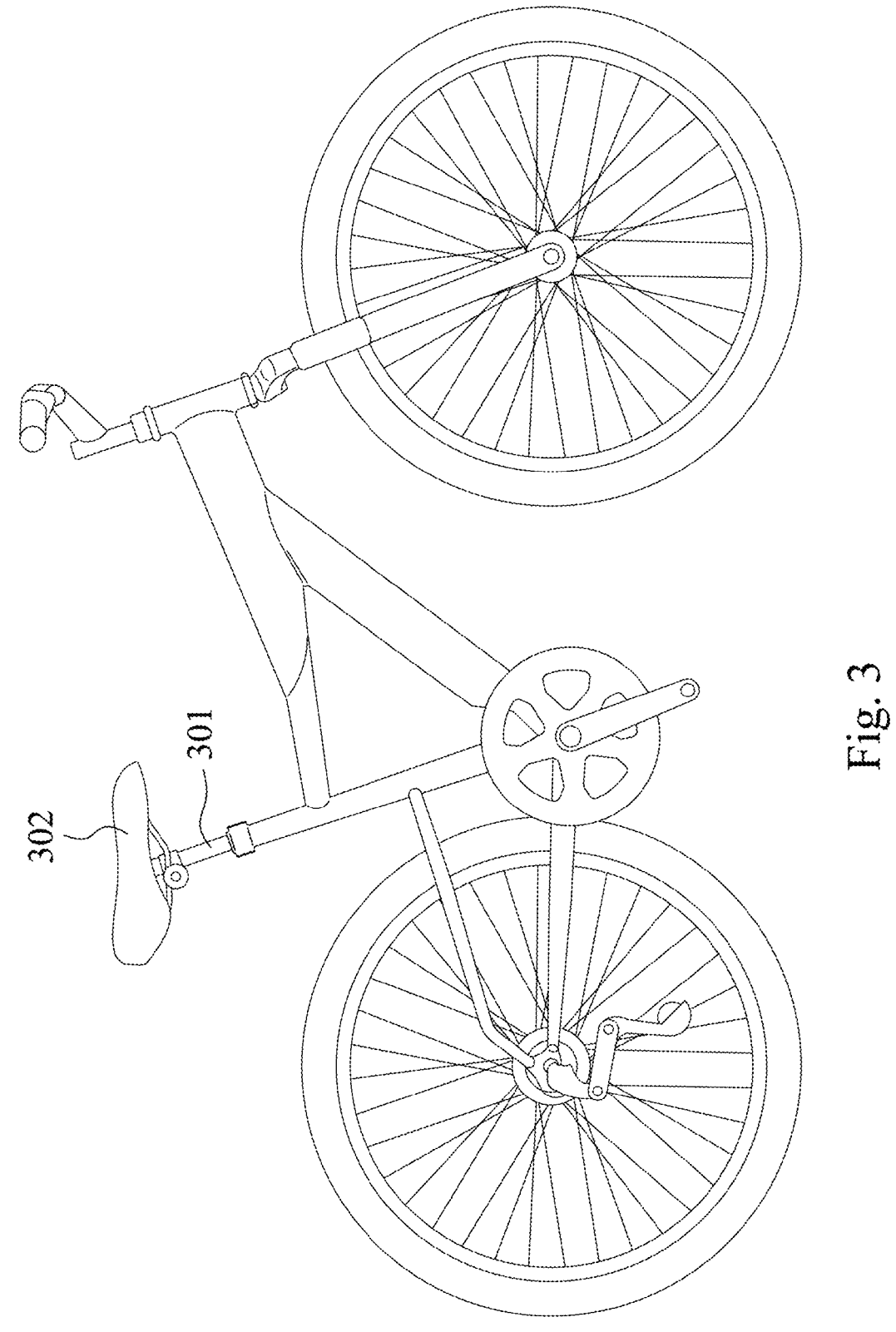
FIG. 3 is a schematic view of a bicycle according to the third embodiment of the present disclosure.

FIG. 3 is a schematic view of a bicycle 300 according to the third embodiment of the present disclosure. With reference to FIG. 3, the bicycle 300 includes a seat post 301 according to the present disclosure and a seat cushion 302, which is connected to the seat post 301. Furthermore, the seat post 301 can also be appropriately replaced with the aforementioned seat post 100 or seat post 200. Therefore, the seat post 301 with the travel spacer is beneficial to select the appropriate maximum length of the seat post 301 according to the usage requirements.

Figure 4:
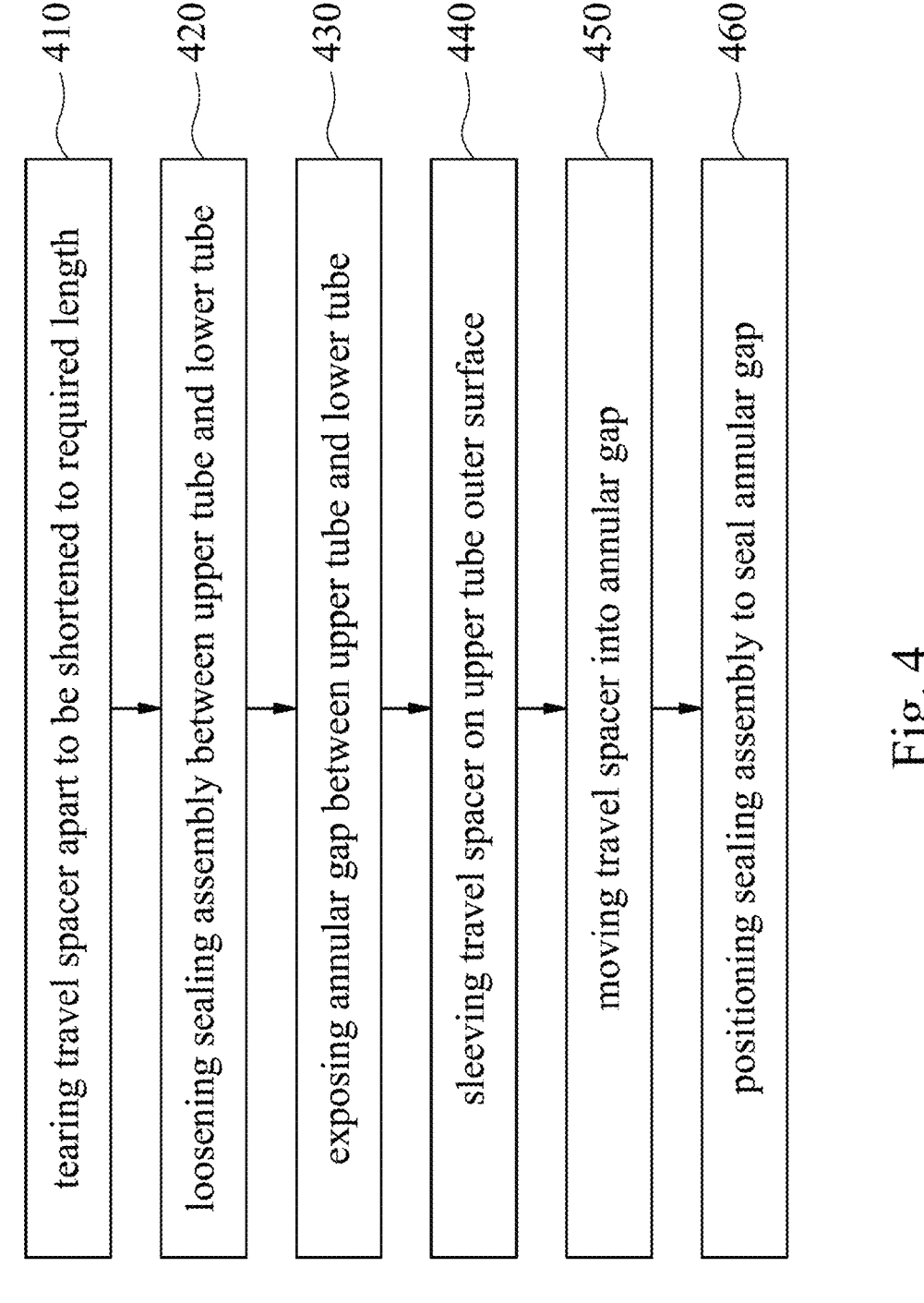
FIG. 4 is a flow chart of a travel spacer installing method according to the fourth embodiment of the present disclosure.

FIG. 4 is a flow chart of a travel spacer installing method 400 according to the fourth embodiment of the present disclosure. The travel spacer installing method 400 of the fourth embodiment will be explained below with reference to the aforementioned seat post 100 of the first embodiment. The seat post 100 of the first embodiment is not limited to apply the travel spacer installing method 400 of the fourth embodiment, and the travel spacer installing method 400 of the fourth embodiment is not limited to the application of the seat post 100 of the first embodiment. With reference to FIG. 1D, FIG. 1E and FIG. 4, the travel spacer installing method 400 is for installing the travel spacer 150 of the seat post 100 of a bicycle and includes steps 420, 430, 440, 450, 460.

The step 420 includes loosening the sealing assembly 160 between the upper tube 130 and the lower tube 110 of the seat post 100. The step 430 includes exposing the annular gap between the upper tube 130 and the lower tube 110, and the annular gap is formed between the upper overlap area 135 of the upper tube 130 and the lower overlap area 115 of the lower tube 110. The step 440 includes sleeving the travel spacer 150 in the annular shape on the upper tube outer surface 131 of the upper tube 130. The step 450 includes moving or sliding the travel spacer 150 into the annular gap. The step 460 includes positioning the sealing assembly 160 (assembling the sealing assembly 160 to a sealing state) to seal the annular gap. Therefore, after the step 460, by disposing the travel spacer 150 between the first stop element 140 and the second stop element 164, the maximum exposed length of the upper tube 130 can be reduced to the first maximum exposed length d1, which is beneficial to select the appropriate maximum length of the seat post 100 for the application requirement.

With reference to FIG. 1G and FIG. 4, the travel spacer installing method 400 may further include step 410. The travel spacer 150 includes the cutting lines 159, and each of the cutting lines 159 is extended along the circumferential direction of an axis direction x1 of the seat post 100. The step 410 includes tearing the travel spacer 150 apart along at least one of the cutting lines 159, so that the travel spacer 150 after being torn is shortened to a required length along the axis direction x1. Therefore, it is beneficial to tear the travel spacer 150 apart with bare hands to adjust the maximum length of the seat post 100, and maintain the structural strength of the travel spacer 150 with the cutting lines 159 thereon.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A seat post, having an axis direction, and comprising:
a lower tube comprising a lower tube inner surface, an accommodating space and an opening, wherein the lower tube inner surface forms the accommodating space and comprises a lower overlap area;
a gas cylinder fixedly disposed in the accommodating space;
an upper tube comprising an upper tube outer surface, which comprises an upper overlap area, wherein the upper tube is movably sleeved on an outside of the gas cylinder along the axis direction and disposed on an inside of the lower overlap area, so that the upper tube is able to extend from the opening, the upper overlap area and the lower overlap area are correspondingly disposed, and ranges of the upper overlap area and the lower overlap area are changeable along with a movement of the upper tube;
a first stop element disposed between the upper overlap area and the lower overlap area;
a travel spacer being in an annular shape; and
a second stop element sleeved on an outside of the upper tube;
wherein the travel spacer is disposed between the upper overlap area and the lower overlap area, and the first stop element, the travel spacer and the second stop element are arranged in sequence along an elongation direction from the accommodating space to the opening.

2. The seat post of claim 1, wherein the travel spacer is movably disposed between the upper overlap area and the lower overlap area along the axis direction.

3. The seat post of claim 1, wherein the first stop element is fixedly sleeved on the upper overlap area.

4. The seat post of claim 1, wherein the first stop element is an anti-rotation element and disposed along a circumferential direction of the axis direction, and the first stop element has a discontinuous outer surface along the circumferential direction.

5. The seat post of claim 1, further comprising:
a sealing assembly being in an annular shape and sleeved on the outside of the upper tube, wherein the sealing assembly is connected to the lower tube and disposed adjacent to the opening, so that the sealing assembly seals the accommodating space, and at least part of the sealing assembly is the second stop element.

6. The seat post of claim 5, wherein the sealing assembly comprises a bushing and a clamp ring, an elasticity of the bushing is greater than an elasticity of the clamp ring, the bushing is the second stop element and disposed between the upper overlap area and the lower overlap area, and the bushing and the clamp ring are arranged in sequence along the elongation direction.

7. The seat post of claim 1, wherein the travel spacer is in a non-closed annular shape, an arc shape of the travel spacer along a circumferential direction of the axis direction is between 210 degrees and 350 degrees, and a spacer length of the travel spacer along the axis direction is between 10 mm and 60 mm.

8. The seat post of claim 1, wherein the travel spacer comprises a plurality of cutting lines, each of the cutting lines is extended along a circumferential direction of the axis direction, and at least two spacings formed by the cutting lines are different.

9. The seat post of claim 1, wherein when two ends of the travel spacer along the axis direction contact the first stop element and the second stop element, respectively, the upper tube has a first maximum exposed length.

10. The seat post of claim 9, wherein when the travel spacer is in an operating state, the travel spacer is disposed between the upper overlap area and the lower overlap area;

wherein when the travel spacer is in a storage state, the travel spacer is not disposed between the upper overlap area and the lower overlap area;

wherein when the travel spacer is in the storage state and the first stop element and the second stop element are in contact, the upper tube has a second maximum exposed length, and the first maximum exposed length is smaller than the second maximum exposed length.

11. The seat post of claim 10, wherein a sum of a spacer length of the travel spacer along the axis direction and the first maximum exposed length is equal to the second maximum exposed length.

12. The seat post of claim 10, wherein the lower tube further comprises a lower tube outer surface, which comprises an annular groove area;

wherein when the travel spacer is in the storage state, the travel spacer is sleeved on the annular groove area.

13. A bicycle, comprising:

the seat post of claim 1; and a seat cushion connected to the seat post.

14. A travel spacer installing method, for installing a travel spacer of a seat post of a bicycle, comprising:

loosening a sealing assembly between an upper tube and a lower tube of the seat post;

exposing an annular gap between the upper tube and the lower tube;

sleeving the travel spacer in an annular shape on an upper tube outer surface of the upper tube;

moving the travel spacer into the annular gap; and positioning the sealing assembly to seal the annular gap.

15. The travel spacer installing method of claim 14, wherein the travel spacer comprises a plurality of cutting lines, each of the cutting lines is extended along a circumferential direction of an axis direction of the seat post, and the travel spacer installing method further comprises:

tearing the travel spacer apart along at least one of the cutting lines, so that the travel spacer after being torn is shortened to a required length along the axis direction.

\* \* \* \* \*